July 9, 1957
E. B. PATTERSON
2,798,813
METHODS FOR MAKING PRE-PREPARED DESSERT
Filed Oct. 28, 1953
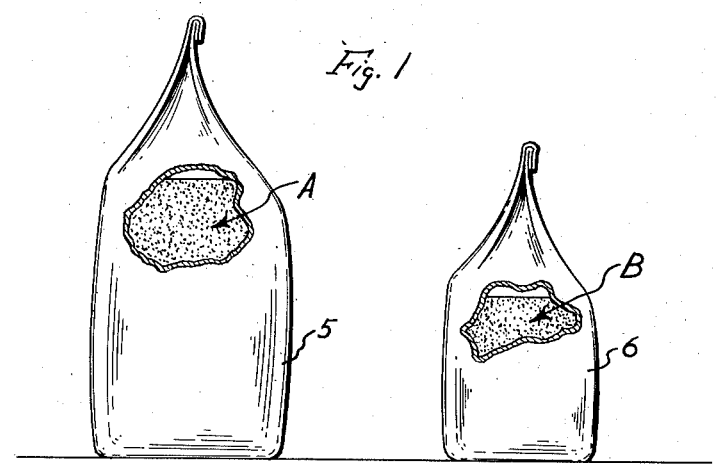
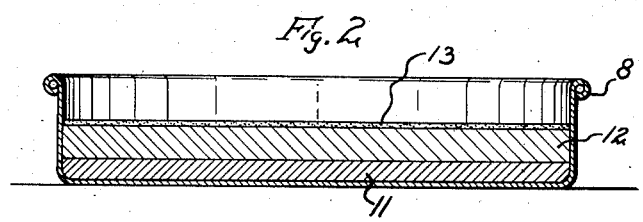
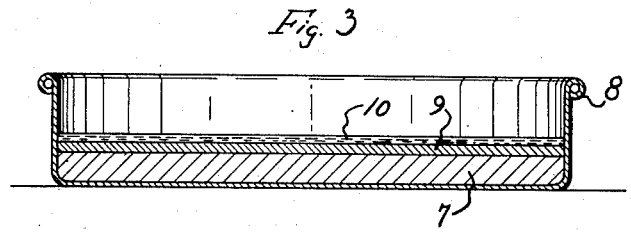
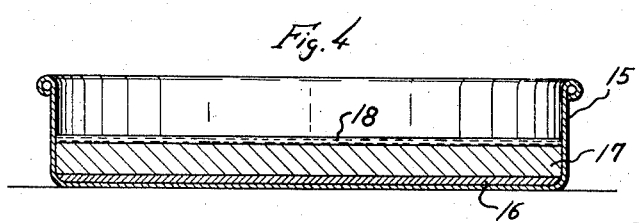
INVENTOR
ESTHER B. PATTERSON
BY Williamson, Williamson,
Schroeder & Adams
ATTORNEYS United States Patent Office 2,798,813
Patented July 9, 1957

2,798,813
METHODS FOR MAKING PRE-PREPARED DESSERT

Esther B. Patterson, Minneapolis, Minn.

Application October 28, 1953, Serial No. 388,813

15 Claims. (Cl. 99—139)

This invention relates to the preparation of foods for human consumption. More particularly, it relates to methods and prepared compositions for producing a class of foods commonly referred to as desserts.

This application is a continuation in part and discloses and claims in addition thereto improvements on my invention as disclosed and claimed in my allowed application for patent entitled "Method of Making Pre-Prepared Dessert," Ser. No. 277,039, filed by me March 17, 1952, now Patent No. 2,672,422.

It is a general object of my invention to provide a novel and improved dessert capable of being made easily, cheaply and simply by unique and novel methods.

A more specific object is to provide a novel and improved dessert the dry components of which may be prepared, packaged and sold, and to provide in conjunction therewith novel methods for converting these ingredients into such a dessert.

Another object is to provide a novel dessert prepared by novel methods and having a pudding-type base with a cake-like covering thereover.

Another object is to provide novel and unique methods for preparing desserts of the class described above.

These and other objects and advantages of my invention will more fully appear from the following description made in connection with the accompanying drawings, wherein like reference characters refer to the same or similar parts throughout the several views, and in which:

Fig. 1 is an end elevational view of the two packaged containers which are sold together and which contain the ingredients utilized in preparing the dessert;

Fig. 2 is a vertical sectional view of a baking container containing a dessert made in accordance with my invention;

Fig. 3 is a vertical sectional view of a baking container showing the materials from which the dessert is made after they have been prepared and deposited within the container in the proper manner prior to baking; and Fig. 4 is a vertical sectional view of a baking container showing the materials from which the dessert may be made after they have been prepared and deposited within the container in an alternative manner prior to baking.

One embodiment of my invention may include, as shown in Figs. 1–4, two dry pulverulent mixtures which, for the sake of convenience, have been indicated as mixtures A and B. As shown in Fig. 1, these mixtures may be pre-prepared in their dry form, mixture A being packaged in a relatively large bag 5 and mixture B being packaged in a smaller and similar bag 6. The two bags 5 and 6 and their mixtures A and B are sold ordinarily in a single packaged unit with the necessary instructions as to the methods to be used in preparing the dessert in its final form in accordance with the invention hereinafter described.

To prepare mixture A, I preferably mix by volume approximately 16 parts of flour, 12 parts of sugar, 3 parts of vegetable shortening, and 1 part leavening agent such as baking powder. To this mixture I add approximately ⅛ part salt and if I desire the pudding to have a cocoa flavor, 2 parts cocoa. This material is well mixed and packaged in the package 5. If desired, for flavor I sometimes add ½ part vanilla. Ordinarily I prefer to use wheat flour, but I have found that other types of flour may be utilized if variations in the final flavor of the resulting dessert are desired. I have found that rye flour, for example, may be used and I believe that other flours such as soy may be utilized. In fact, I believe that any flour normally used in the preparation of breads and pastries may be utilized in accordance with the flavor and texture desired.

I prepare mixture B by mixing together by volume about 8 parts white granulated sugar, 8 parts brown sugar, 2 parts powdered skim milk, a dash of salt, and if I desire the dessert to have a cocoa flavor, 2 parts cocoa. These ingredients are mixed well in their dried state and packaged in the container 6.

In the preparation of the dessert, the contents of the container 5, which is mixture A, is mixed thoroughly with about 8 parts of a drinkable aqueous solution such as milk or water and stirred until the same becomes a relatively thick batter 7 which is placed in a baking container 8. If desired, I believe that, since eggs are composed principally of water, a number of eggs could be utilized in substitution for the milk or water to provide increased richness for the batter and at the same time thereby provide the necessary liquid with which to form the batter 7 from the contents of the container 5. I then proceed to sprinkle the contents of package 6, which contains mixture B, evenly over the top of the batter 7 to form a layer 9.

The next step in my methods of producing this dessert is to pour approximately 32 parts of water, fruit juice, milk or other drinkable aqueous solution 10 over the top of the layer 9 and the batter 7 and then bake the entire contents of the baking container 8 at a temperature of approximately 375° F. for a period of about 40 minutes. In the event milk is used, I find I can eliminate the dried milk content of the sugarous mixture B contained in package 6 as the liquid milk will provide the component necessary to form, in combination with the sugarous mixture and the material absorbed from the batter, the pudding-like base 11.

The resulting dessert is shown in vertical section in Fig. 2. It consists of a pudding-like base of custard 11 with a cake-like covering 12, this cake-like covering having a thin crispy crust 13 across its upper surface. The relative thicknesses of the materials 11, 12 and 13 are best shown in Fig. 2. This crust 13 may be slightly sugary if the mixture is baked at once.

I have found that as an alternative method, I may sprinkle the contents of package 6, which is mixture B, evenly over the bottom of a container 15 so as to form a thin layer 16 across the interior thereof. I then cover this layer 16 with the relatively thick batter formed from the mixture A in the manner described hereinbefore so that a relatively thick layer 17 extends thereover and across the interior of the container 15. Thereafter, I pour the 32 parts of cold water, fruit juice, milk or other drinkable aqueous solution across the top of the layer 17 of batter so as to form a layer 18 thereover. In the event milk is used, I find that I can eliminate the dried milk content of the mixture B contained in package 6 as the liquid milk will provide the components necessary to form in combination with the sugarous mixture and the material absorbed from the batter, the pudding-like base 11. I then place the container 15 with its entire contents in an oven and bake the same at a temperature of about 375° F. for a period of about 40 minutes. The resulting dessert will have a pudding-like base or custard similar to the pudding-like base 11 and a cake-like covering thereover similar to the covering 12 formed in the first-mentioned method. The crispy crust will not be formed across the upper surface of the cake-like covering but in other respects the resulting dessert will be highly similar to that formed in the first-mentioned method.

I am not positive of exactly what action takes place during the baking of this material to form this new dessert, but it appears that at least some of the water or aqueous solution with which the batter is covered in each of the methods, passes downwardly through the batter during the baking process. I believe that during its passage through the batter 7 and 17, the aqueous solutions 10 and 18 pick up certain ingredients from the batter, probably some of the flour, to provide the necessary ingredients to form a thick and pleasing pudding layer base beneath the cake-like covering 12. The dessert resulting from the second method described herein has not been shown in the drawings since it is considered sufficient to indicate that it is similar to the dessert shown in Fig. 2 with the exception that the crispy crust at the top will be absent. The cake-like covering in the dessert resulting from the practice of each of the methods described herein has a texture highly resembling that of a cake. The layer 13 at the top of the dessert formed when the first mentioned method is utilized is thin and crispy and may be somewhat sugary. I have found that the dessert resulting from the practice of each of these methods is very flavorable and enjoyable to eat and can be produced with a minimum of time and effort.

One of the most important advantages of my invention, of course, is the fact that it provides a novel and delectable dessert, the dry components of which may be prepared and packaged so that the dessert may be prepared with a minimum of time and delay. An important feature of my invention is that no cooking skill whatsoever is required in order to successfully prepare this pleasing dessert. There is no possibility of the resulting dessert as described not being produced if the simple instructions outlined above are followed.

If I desire to obtain a pudding beneath the cake-like covering 12 having a vanilla flavoring, this may be accomplished by substituting white sugar for brown sugar in mixture B and by eliminating the cocoa from both of the mixtures. If caramel flavoring is desired, the cocoa is withheld from both mixtures A and B and brown sugar is substituted in both mixtures for the white sugar. If an orange flavored dessert is required, I leave out the cocoa in both mixtures A and B and substitute white for brown sugar in mixture B, adding powdered orange thereto in desired quantities. In each instance, it appears that as the batter raises during the baking process because of the presence of the leavening agent, the aqueous solution 10 which has dissolved at least a part of the mixture B seeps through the batter and collects beneath the same, forming a pudding-like material therebelow. In these instances as well as when the cocoa is utilized, it is believed that the water passing through the raising batter picks up enough of the flour ingredient from the batter to provide the necessary thickening to form the pudding-like material 11.

In the practice of the secondly described method, I believe that the aqueous solution 18 picks up enough of the flour ingredient of the raising batter as it passes downwardly therethrough so that when it reaches the mixture B in the layer 16 and absorbs at least a portion thereof, it will readily form a pudding base similar to the pudding base 11.

Thus it can be seen that I have provided novel and unique methods for preparing a dessert of the type having a pudding base and a cake-like covering thereover. At the same time, I have provided simple methods which, when utilized in conjunction with a novel combination of dry ingredients for the production of such a dessert, will yield a unique and pleasing type of dessert. The dry ingredients for the production of these desserts may be pre-prepared in dry pulverulent form and packaged for ready sale and/or storage. Thus, the necessary ingredients for the dessert may be kept readily available and utilized in a very brief period to provide an appetizing and pleasing dessert.

It will, of course, be understood that various changes may be made in the form, details, arrangement and proportions of the various parts without departing from the scope of my invention.

What I claim is:

1. The method of preparing a dessert having a pudding base, a cake-like covering over the pudding base, and a thin sugary crust atop the covering, said method consisting in adding a drinkable aqueous solution to a dry pulverulent mixture containing flour, shortening and a leavening agent; mixing said aqueous solution with said mixture and forming a batter therefrom; placing said batter into a baking container; spreading a dry pulverulent mixture of sugar and dried milk over the top of said batter; covering said batter with a drinkable aqueous solution; and thereafter baking the entire contents of the container until at least some of said aqueous solution covering said batter has dissolved at least some of said second mentioned mixture and descended through said batter to form a pudding base and until said batter has been converted into a cake-like covering thereover.

2. The method of preparing a dessert having a pudding base, a cake-like covering over the pudding base, and a thin sugary crust atop the covering, said method consisting in adding liquid milk to a dry pulverulent mixture containing flour, shortening and a leavening agent; mixing said milk with said mixture and forming a batter therefrom; placing said batter into a baking container; spreading a dry pulverulent mixture of sugar and dried milk over the top of said batter; covering said batter with a layer of a drinkable aqueous solution; and thereafter baking the entire contents of the container until at least some of the said aqueous solution covering said batter has dissolved at least some of said second mentioned mixture and descended through said batter to form a pudding base and until said batter has been converted into a cake-like covering thereover.

3. The method of preparing a dessert having a pudding base, a cake-like covering over the pudding base, and a thin sugary crust atop the covering, said method consisting in adding water to a dry pulverulent mixture containing flour, shortening and a leavening agent; mixing said water with said mixture and forming a batter therefrom; placing said batter into a baking container; spreading a dry pulverulent mixture of sugar and dried milk over the top of said batter; covering said batter with a layer of drinkable aqueous solution and thereafter baking the entire contents of the container until at least some of said aqueous solution covering said batter has dissolved at least some of said second mentioned mixture and descended through said batter to form a pudding base and until said batter has been converted into a cake-like covering thereover.

4. The method of preparing a dessert having a pudding base, a cake-like covering over the pudding base, and a thin sugary crust atop the covering, said method consisting in adding a drinkable aqueous solution to a dry pulverulent mixture containing wheat flour, shortening and a leavening agent; mixing said aqueous solution with said mixture and forming a batter therefrom; placing said batter into a baking container; spreading a dry pulverulent mixture of sugar and dried milk over the top of said batter; covering said batter with a drinkable aqueous solution; and thereafter baking the entire contents of the container until at least some of said aqueous solution covering said batter has dissolved at least some of said second mentioned mixture and descended through said batter to form a pudding base and until said batter has been converted into a cake-like covering thereover.

5. The method of preparing a dessert having a pudding base, a cake-like covering over the pudding base and a thin sugary crust atop the covering, said method consisting in adding a drinkable aqueous solution to a dry pulverulent mixture containing wheat flour, shortening and a leavening agent; mixing said aqueous solution with said mixture and forming a batter therefrom; placing said batter into a baking container; spreading a dry pulverulent mixture of sugar and dried milk over the top of said batter; covering said batter with water; and thereafter baking the entire contents of the container until at least some of said water covering said batter has dissolved at least some of said second mentioned mixture and descended through said batter to form a pudding base and until said batter has been converted into a cake-like covering thereover.

6. The method of preparing a dessert having a pudding base, a cake-like covering over the pudding base and a thin sugary crust atop the covering, said method consisting in adding a drinkable aqueous solution to a dry pulverulent mixture containing wheat flour, shortening and a leavening agent; mixing said aqueous solution with said mixture and forming a batter therefrom; placing said batter into a baking container; spreading a dry pulverulent mixture of sugar and dried milk over the top of said batter; covering said batter with milk; and thereafter baking the entire contents of the container until at least some of said milk covering said batter has dissolved at least some of said second mentioned mixture and desceneded through said batter to form a pudding base and until said batter has been converted into a cake-like covering thereover.

7. The method of preparing a dessert having a pudding base, a cake-like covering over the pudding base, and a thin sugary crust atop the covering, said method consisting in adding liquid milk to a dry pulverulent mixture containing wheat flour, shortening and a leavening agent; mixing said milk with said mixture and forming a batter therefrom; placing said batter into a baking container; spreading a dry pulverulent mixture of sugar and dried milk over the top of said batter; covering said batter with a layer of drinkable aqueous solution; and thereafter baking the entire contents of the container until at least some of said drinkable aqueous solution has dissolved at least some of said second mentioned mixture and descended through said batter to form a pudding base and until said batter has been converted into a cake-like covering thereover.

8. The method of preparing a dessert having a pudding base, a cake-like covering over the pudding base, and a thin sugary crust atop the covering, said method consisting in adding liquid milk to a dry pulverulent mixture containing wheat flour, shortening and a leavening agent; mixing said milk with said mixture and forming a batter therefrom; placing said batter into a baking container; spreading a dry pulverulent mixture of sugar and dried milk over the top of said batter; covering said batter with a layer of milk; and thereafter baking the entire contents of the container until at least some of said liquid milk covering said batter has dissolved at least some of said second mentioned mixture and descended through said batter to form a pudding base and until said batter has been converted into a cake-like covering thereover.

9. The method of preparing a dessert having a pudding base and a thin cake-like covering over the pudding base, said method consisting in adding a drinkable aqueous solution to a dry pulverulent mixture containing flour, shortening and a leavening agent; mixing said aqueous solution with said mixture and forming a batter therefrom; spreading a dry pulverulent mixture of sugar and dried milk over the bottom of a baking container; covering said pulverulent mixture of sugar and dried milk with said batter; covering said batter with a layer of drinkable aqueous solution; and thereafter baking the entire contents of the container until at least some of said aqueous solution covering said batter has descended through said batter and dissolved at least some of said second mentioned mixture to form a pudding base and until said batter has been converted into a cake-like covering thereover.

10. The method of preparing a dessert having a pudding base, and a cake-like covering over the pudding base, said method consisting in adding liquid milk to a dry pulverulent mixture containing flour, shortening and a leavening agent; mixing said milk with said mixture and forming a batter therefrom; covering the bottom of the interior of a baking container with a dry pulverulent mixture of sugar and dried milk; covering said dry pulverulent mixture of sugar and dried milk with said batter; covering said batter with a layer of drinkable aqueous solution; and thereafter baking the entire contents of the container until at least some of said aqueous solution has descended through said batter and dissolved at least some of said dry pulverulent mixture containing sugar and dried milk to form a pudding base and until said batter has been converted into a cake-like covering thereover.

11. The method of preparing a dessert having a pudding base, and a cake-like covering over the pudding base, said method consisting in adding water to a dry pulverulent mixture containing flour, shortening and a leavening agent; mixing said water with said mixture and forming a batter therefrom; spreading a dry pulverulent mixture of sugar and dried milk over the bottom of a baking container; spreading said batter over said second mentioned mixture and the bottom of said baking container; covering said batter with a layer of a drinkable aqueous solution; and thereafter baking the entire contents of the container until at least some of said aqueous solution covering said batter has descended through said batter and dissolved at least some of said second mentioned mixture to form a pudding base and until said batter has been converted into a cake-like covering thereover.

12. The method of preparing a dessert having a pudding base and a thin cake-like covering over the pudding base, said method consisting in adding a drinkable aqueous solution to a dry pulverulent mixture containing flour, shortening and a leavening agent; mixing said aqueous solution with said mixture and forming a batter therefrom; spreading a dry pulverulent mixture of sugar and dried milk over the bottom of said baking container; covering said pulverulent mixture of sugar and dried milk with said batter; covering said batter with a layer of milk, and thereafter baking the entire contents of the container until at least some of said milk covering said batter has descended through said batter and dissolved at least some of said second mentioned mixture to form a pudding base and until said batter has been converted into a cake-like covering thereover.

13. The method of preparing a dessert having a pudding base and a cake-like covering thereover, said method consisting in adding a drinkable aqueous solution to a dry pulverulent mixture containing flour, shortening and a leavening agent; mixing said aqueous solution with said mixture and forming a batter therefrom; spreading a dry pulverulent mixture of sugar and dried milk over the bottom of a baking container; covering said pulverulent mixture of sugar and dried milk with said batter; covering said batter with a layer of water; and thereafter baking the entire contents of the container until at least some of said water covering said batter has descended through said batter and dissolved at least some of said second mentioned mixture to form a pudding base and until at least some of said batter has been converted into a cake-like covering thereover.

14. The method of preparing a dessert having a pudding base, a cake-like covering over the pudding base and a thin sugary crust atop the covering, said method consisting in adding a drinkable aqueous solution to a dry pulverulent mixture containing flour, shortening and a leavening agent; mixing said aqueous solution with said mixture and forming a batter therefrom; placing said batter into a baking container; spreading a dry pulverulent sugarous mixture over the top of said batter; covering said batter and said sugarous mixture with milk; and thereafter baking the entire contents of the container until at least some of said milk covering said batter had dissolved at least some of said second mentioned mixture and descended through said batter to form a pudding base and until said batter has been converted into a cake-like covering thereover.

15. The method of preparing a dessert having a pudding base and a cake-like covering thereover, said method consisting in adding a drinkable aqueous solution to a dry pulverulent mixture containing flour, shortening and a leavening agent; mixing said aqueous solution with said mixture and forming a batter therefrom; spreading a dry pulverulent sugarous mixture over the bottom of a baking container; covering said sugarous mixture with said batter; covering said batter with a layer of milk; and thereafter baking the entire contents of the container until at least some of said milk covering said batter has descended through said batter and dissolved at least some of said second mentioned mixture to form a pudding base and until at least some of said batter has been converted into a cake-like covering thereover.

References Cited in the file of this patent
UNITED STATES PATENTS 2,672,422     Patterson _____ Mar. 16, 1954